(12) United States Patent
Wang et al.

(10) Patent No.: US 10,110,407 B2
(45) Date of Patent: Oct. 23, 2018

(54) TAE/FAE COMPENSATION FOR ANTENNA PORTS IN COMP TRANSMISSION

(75) Inventors: Hai Wang, Beijing (CN); Yang Hu, Beijing (CN); Shaohua Li, Beijing (CN); Jianfeng Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 324 days.

(21) Appl. No.: 14/238,344

(22) PCT Filed: Dec. 27, 2011

(86) PCT No.: PCT/CN2011/002199
§ 371 (c)(1),
(2), (4) Date: Feb. 11, 2014

(87) PCT Pub. No.: WO2013/023334
PCT Pub. Date: Feb. 21, 2013

(65) Prior Publication Data
US 2014/0192921 A1    Jul. 10, 2014

(30) Foreign Application Priority Data

Aug. 12, 2011 (WO) ................ PCT/CN2011/001348

(51) Int. Cl.
*H04L 27/26*     (2006.01)
*H04B 7/06*      (2006.01)
(Continued)

(52) U.S. Cl.
CPC ......... *H04L 27/2646* (2013.01); *H04B 7/063* (2013.01); *H04B 7/0632* (2013.01);
(Continued)

(58) Field of Classification Search
CPC . H04L 1/0026; H04L 1/06; H04L 1/20; H04L 2001/0092; H04L 27/2646;
(Continued)

(56) References Cited

U.S. PATENT DOCUMENTS

| 2004/0077378 A1* | 4/2004 | Kim | H04B 7/063 |
| | | | 455/562.1 |
| 2007/0217323 A1* | 9/2007 | Ko | H04L 5/023 |
| | | | 370/201 |

(Continued)

FOREIGN PATENT DOCUMENTS

EP  2385733 A1  11/2011
WO  2009093878 A1  7/2009
(Continued)

OTHER PUBLICATIONS

Author Unknown, "Reciprocity modelling for TDD CoMP evaluation," Alcatel-Lucent Shanghai Bell, Alcatel-Lucent; 3GPP TSG-RAN WG1 #65; R1-111437. May 9-13, 2011. pp. 1-5. Barcelona, Spain.

(Continued)

*Primary Examiner* — Kwang B Yao
*Assistant Examiner* — Ricardo Castaneyra
(74) *Attorney, Agent, or Firm* — Patent Portfolio Builders, PLLC (57) ABSTRACT

The present invention discloses a user equipment (UE) (100), comprising: a first measuring unit (110) adapted to measure time alignment error (TAE) and/or frequency alignment error (FAE) for antenna ports belonging to transmission point devices in Coordinated Multipoint Transmission (CoMP), the TAE including internal TAE and/or external TAE; and a first feedback unit (120) adapted to feedback the measured internal TAE, and/or external TAE, and/or FAE to at least one of the transmission point devices. The present invention provides a simple, direct and efficient approach for measuring and feeding back the cell-specific internal TAE and/or the UE-specific external TAE/FAE by UE and compensating the TAE/FAE by the transmission point device in the CoMP transmission, so that the CoMP transmission can properly operate.

17 Claims, 6 Drawing Sheets

(51) Int. Cl.
  H04L 1/00 (2006.01)
  H04L 1/06 (2006.01)
  H04L 1/20 (2006.01)
(52) U.S. Cl.
  CPC ......... H04B 7/0639 (2013.01); H04L 1/0026 (2013.01); H04L 1/06 (2013.01); H04L 1/20 (2013.01); *H04L 2001/0092* (2013.01)
(58) Field of Classification Search
  CPC .... H04B 7/0639; H04B 7/063; H04B 7/0632; H04W 56/00; H04W 56/0035; H04W 56/0005; H04W 56/0045; H04W 88/02
  See application file for complete search history.

(56) References Cited

U.S. PATENT DOCUMENTS

| | | | |
|---|---|---|---|
| 2008/0316950 A1* | 12/2008 | Damnjanovic | H04W 52/34 370/311 |
| 2010/0027456 A1* | 2/2010 | Onggosanusi | H04B 7/024 370/312 |
| 2011/0002410 A1 | 1/2011 | Forenza et al. | |
| 2011/0032839 A1* | 2/2011 | Chen | H04B 7/024 370/252 |
| 2011/0085537 A1* | 4/2011 | Tsai | H04B 7/0619 370/342 |
| 2011/0158164 A1* | 6/2011 | Palanki | H04W 56/0015 370/328 |
| 2011/0195670 A1* | 8/2011 | Dakshinamurthy | H01Q 3/2647 455/73 |
| 2011/0286376 A1* | 11/2011 | Yoo | H04W 56/00 370/312 |
| 2012/0257575 A1* | 10/2012 | Davydov | H04B 7/024 370/328 |
| 2012/0314591 A1* | 12/2012 | Zhang | H04L 12/189 370/252 |

FOREIGN PATENT DOCUMENTS

| | | |
|---|---|---|
| WO | 2010076854 A1 | 7/2010 |
| WO | 2010135712 A1 | 11/2010 |
| WO | 2011076541 A1 | 6/2011 |

OTHER PUBLICATIONS

Author Unknown, "Problem of dual-codebook feedback framework with RF timing misalignment," CATT; 3GPP Ran WG1 meeting #61bis; R1-103523; Jun. 28-Jul. 2, 2010. pp. 1-2. Dresden, Germany.

3rd Generation Partnership Project, "3GPP TR 36.814 V9.0.0 (Mar. 2010)," 3rd Generation Partnership Project; Technical Specification Group Radio Access Network; Evolved Universal Terrestrial Radio Access (E-UTRA); Further advancements for E-UTRA physical layer aspects (Release 9). Mar. 2010. pp. 1-107.

3rd Generation Partnership Project, "3GPP TS 36.104 V12.0.0 (Jun. 2013)," 3rd Generation Partnership Project; Technical Specification Group Radio Access Network; Evolved Universal Terrestrial Radio Access (E-UTRA); Base Station (BS) radio transmission and reception (Release 12). Jun. 2013. pp. 1-139.

3rd Generation Partnership Project, "3GPP TS 36.213 V11.3.0 (Jun. 2013)," 3rd Generation Partnership Project; Technical Specification Group Radio Access Network; Evolved Universal Terrestrial Radio Access (E-UTRA); Physical layer procedures (Release 11). Jun. 2013. pp. 1-176.

Author Unknown, "Real-life Transmission issues," Huawei, HiSilicon; 3GPP TSG RAN WG1 Meeting #65; R1-111389; May 9-13, 2011. pp. 1-4. Barcelona, Spain.

EP office action in application No. 11870928.6 dated Aug. 2, 2017.
EP office action in application No. 11870928.6 dated Jun. 7, 2016.
EP office action in application No. 11870928.6 dated Jan. 14, 2015.

* cited by examiner

TAE/FAE COMPENSATION FOR ANTENNA PORTS IN COMP TRANSMISSION

TECHNICAL FIELD

The present invention generally relates to the field of wireless communication, and more particularly relates to time alignment error (TAE) and/or frequency alignment error (FAE) measurement, feedback and compensation for antenna ports in Coordinated Multipoint Transmission (CoMP).

BACKGROUND

In 3GPP, Coordinated Multipoint Transmission (CoMP) is considered as a tool to improve the coverage of high data rates and cell-edge throughput and/or to increase system throughput. In CoMP transmission, two modes are defined, one is joint transmission (JT), and the other is coordinated scheduling/beamforming (CS/CB). In CoMP transmission, multiple transmission point devices (e.g., base station, Node B, or evolved Node B (eNB)) can transmit data simultaneously for one user equipment (UE). Assume that we have M transmission point devices and each device has K antenna ports, wherein the antenna port may in practice be implemented either as a single physical transmit antenna or as a combination of multiple physical antenna elements, then at time t and frequency f, the signal coming from the $k^{th}$ port of the $m^{th}$ transmission point device can be given by:

$$r_{k,m}(f,t)=\exp(-j2\pi(f+\Delta f_{k,m})(t+\tau_{k,m})), k=0,1,\ldots,K-1 \quad (1)$$

wherein $\Delta f_{k,m}$ and $\tau_{k,m}$ are frequency offset and time offset of the $k^{th}$ port of the $m^{th}$ transmission point device relative to a reference port, respectively. The phase difference between the $(k_1,m_1)$th and $(k_2,m_2)$th ports is $$\theta_{k_1,k_2,m_1,m_2}(f,t)=-j2\pi((\Delta f_{k_1,m_1}-\Delta f_{k_2,m_2})t+(\tau_{k_1,m_1}-\tau_{k_2,m_2})f+\phi_{k_1,k_2,m_1,m_2}) \quad (2)$$

$$\text{wherein } \phi_{k_1,k_2,m_1,m_2}=\Delta f_{k_1,m_1}\tau_{k_1,m_1}-\Delta f_{k_2,m_2}\tau_{k_2,m_2} \quad (3)$$

From equation (2), we can see that the phase difference has close relationship with FAE ($\Delta f_{k_1,m_1}-\Delta f_{k_2,m_2}$) and TAE ($\tau_{k_1,m_1}-\tau_{k_2,m_2}$), wherein the FAE and TAE are respectively frequency offset and time offset between antenna ports. WO 2008/097187 discloses a method for calibrating time misalignment (i.e., TAE) of signal transmitted from a transmitting unit to a receiving unit.

For CoMP transmission, the TAE includes subframe time offset, transmission delay and time offset between ports. The TAE is expected to be much larger than the TAE in a single cell, e.g., 65 ns. Even with 65 ns, according to equation (2), the maximum phase difference between lowest and highest sub-carriers is higher than 2.3 π for a system with 20M bandwidth. Such a time misalignment will typically result in increase of frequency selectivity, especially for a system with wide bandwidth. Without knowledge of the time misalignment at the transmitter, CoMP with joint precoding will seriously suffer, especially under the strategy of wideband precoding with one precoding matrix index (PMI) since frequency variations due to TAE do not match wideband precoding any more.

Besides TAE, as shown in equation (2), the FAE also has great impact on the precoding performance. In practice, frequency offset between the transmission point device and UE is conventionally estimated and compensated by UE to improve demodulation performance. FAE may not be a significant problem in a single-cell transmission with one remote radio unit (RRU) multiple-input multiple-output (MIMO) since the same oscillator is used for RF chains connecting to multiple transmit antennas. However, it is typically impossible in practice to use the same oscillator for multiple geometrically-separated transmission points, e.g. CoMP joint transmission (CoMP-JT). According to current 3GPP RAN4 specifications, the minimal requirement of frequency error is within ±0.05 ppm for a wide area base station. With this requirement, it is assumed that feedback delay is 5 ms and the frequency is 2.6 GHz. According to equation (2), the phase difference between the feedback phase and usage phase is 2.6π. This may cause CoMP transmission to fail.

In demodulation reference signal (DMRS)-based precoding technique, it is difficult to compensate the FAE and TAE at UE side. Since in DMRS-based precoding technique, the channel seen by UE is composite from multiple points, UE can not differentiate the signal from different antennas. Hence, FAE and TAE cannot be fully compensated. Whereas in cell-specific reference signal (CRS)-based or channel state information reference signal (CSI-RS)-based precoding technique, FAE and TAE can be estimated.

SUMMARY

An object of the present invention is to provide a way for compensating TAE and/or FAE in CoMP transmission at the transmission point device side. Compared with TAE compensation in single-cell MIMO, the TAE/FAE compensation in CoMP transmission is different. In single cell, the TAE seen by different UEs is the same. However, in CoMP transmission, the TAE seen by different UEs is not the same. Besides TAE compensation, transmission point device needs FAE compensation. Just as TAE in CoMP transmission, FAE seen by different UEs is not necessarily the same.

According to a first aspect of the present invention, there is provided a UE. The UE comprises a first measuring unit adapted to measure TAE and/or FAE for antenna ports belonging to transmission point devices in CoMP transmission, the TAE including internal TAE and/or external TAE; and a first feedback unit adapted to feedback the measured internal TAE, and/or external TAE, and/or FAE to at least one of the transmission point devices.

According to an embodiment of the present invention, the internal TAE is TAE among antenna ports in a same transmission point device, the external TAE is TAE among antenna ports in different transmission point devices, and the FAE is FAE between a serving transmission point device and any other transmission point device and/or FAE among antenna ports in a same transmission point device.

According to an embodiment of the present invention, the internal TAE is cell-specific, and the external TAE and the FAE are UE-specific.

According to an embodiment of the present invention, the UE further comprises a calculating unit adapted to calculate at least one of precoding matrix index (PMI), channel quality indicator (CQI), and rank indicator (RI) on the basis of channel compensated with the measured internal TAE, and/or external TAE, and/or FAE. The first feedback unit is further adapted to feedback a result of the calculation to the at least one of the transmission point devices.

According to an embodiment of the present invention, the first measuring unit is adapted to measure the TAE on the basis of phase difference between antenna ports of different frequencies at a specific time.

According to an embodiment of the present invention, the first measuring unit is adapted to measure the FAE on the basis of phase difference between antenna ports at different times of a specific frequency.

According to an embodiment of the present invention, the UE belongs to at least one respective set of following UEs: a first set of UEs each comprising a second measuring unit adapted to measure the internal TAE and a second feedback unit adapted to feedback the internal TAE to the at least one of the transmission point devices, a second set of UEs each comprising a third measuring unit adapted to measure the external TAE and a third feedback unit adapted to feedback the external TAE to the at least one of the transmission point devices, and a third set of UEs each comprising a fourth measuring unit adapted to measure the FAE and a fourth feedback unit adapted to feedback the FAE to the at least one of the transmission point devices.

According to a second aspect of the present invention, there is provided a transmission point device for compensating TAE and/or FAE for antenna ports belonging to transmission point devices in CoMP transmission, the TAE including internal TAE and/or external TAE. The transmission point device comprises a receiving unit adapted to receive internal TAE, and/or external TAE, and/or FAE from one or more UEs, and a compensating unit adapted to compensate the internal TAE, and/or external TAE, and/or FAE for respective antenna ports on the basis of the received internal TAE, and/or external TAE, and/or FAE.

According to an embodiment of the present invention, the internal TAE is TAE among antenna ports in a same transmission point device, the external TAE is TAE among antenna ports in different transmission point devices, and the FAE is FAE between a serving transmission point device and any other transmission point device and/or FAE among antenna ports in a same transmission point device.

According to an embodiment of the present invention, the internal TAE is cell-specific, and the external TAE and FAE are UE-specific.

According to an embodiment of the present invention, the transmission point device further comprises a determining unit adapted to determine, from the one or more UEs, a first set of UEs adapted to measure and feedback the internal TAE, and/or a second set of UEs adapted to measure and feedback the external TAE, and/or a third set of UEs adapted to measure and feedback the FAE.

According to an embodiment of the present invention, the receiving unit is further adapted to receive the internal TAE, and/or external TAE, and/or FAE from the first, second, and third sets of UEs respectively.

According to an embodiment of the present invention, the transmission point device further comprises an averaging unit adapted to average a plurality of internal TAE measured by UEs among the first set of UEs associated with a same transmission point device received by the receiving unit, and/or average a plurality of FAE measured by UEs among the third set of UEs associated with a same pair of transmission point devices received by the receiving unit.

According to an embodiment of the present invention, the compensating unit is further adapted to compensate the internal TAE, and/or external TAE, and/or FAE for respective antenna ports on the basis of the averaged internal TAE, and/or the external TAE, and/or the averaged FAE.

According to an embodiment of the present invention, the determining unit determines the first set of UEs according to channel condition thereof, determines the second set of UEs as those being serviced by the CoMP transmission, and determines the third set of UEs according to channel condition thereof.

According to an embodiment of the present invention, the compensating unit compensates the internal TAE in time domain, and compensates the external TAE and the FAE both in frequency domain.

According to an embodiment of the present invention, the compensating unit compensates, on the basis of the received internal TAE, and/or external TAE, and/or FAE, phase differences for signals transmitted from the transmission point devices to respective antenna ports due to the internal TAE, and/or external TAE, and/or FAE.

According to a third aspect of the present invention, there is provided a system for compensating TAE and/or FAE for antenna ports belonging to transmission point devices in CoMP transmission, the TAE including internal TAE and/or external TAE. The system comprises one or more UEs according to the present invention and the transmission point device according to the present invention According to a fourth aspect of the present invention, there is provided a method for use in a UE. The method comprises measuring TAE and/or FAE for antenna ports belonging to transmission point devices in CoMP transmission, the TAE including internal TAE and/or external TAE, and feeding back the measured internal TAE, and/or external TAE, and/or FAE to at least one of the transmission point devices.

According to an embodiment of the present invention, the internal TAE is TAE among antenna ports in a same transmission point device, the external TAE is TAE among antenna ports in different transmission point devices, and the FAE is FAE between a serving transmission point device and any other transmission point device and/or FAE among antenna ports in a same transmission point device.

According to an embodiment of the present invention, the internal TAE is cell-specific, and the external TAE and the FAE are UE-specific.

According to an embodiment of the present invention, the method further comprises calculating at least one of PMI, CQI and RI on the basis of channel compensated with the measured internal TAE, and/or external TAE, and/or FAE, and feeding back a result of the calculation to the at least one of the transmission point devices.

According to an embodiment of the present invention, the step of measuring the TAE is performed on the basis of phase difference between antenna ports of different frequencies at a specific time.

According to an embodiment of the present invention, the step of measuring the FAE is performed on the basis of phase difference between antenna ports at different times of a specific frequency.

According to an embodiment of the present invention, the UE belongs to at least respective one of a first set of UEs, a second set of UEs, and a third set of UEs, and the first set of UEs each measuring the internal TAE and feeding back the internal TAE to the at least one of the transmission point devices, the second set of UEs each measuring the external TAE and feeding back the external TAE to the at least one of the transmission point devices, and the third set of UEs each measuring the FAE and feeding back the FAE to the at least one of the transmission point devices.

According to a fifth aspect of the present invention, there is provided a method for compensating TAE and/or FAE for antenna ports belonging to transmission point devices in CoMP transmission by a transmission point device, the TAE including internal TAE and/or external TAE. The method comprises receiving internal TAE, and/or external TAE, and/or FAE from one or more UEs, and compensating the internal TAE, and/or external TAE, and/or FAE for respective antenna ports on the basis of the received internal TAE, and/or external TAE, and/or FAE.

According to an embodiment of the present invention, the internal TAE is TAE among antenna ports in a same transmission point device, the external TAE is TAE among antenna ports in different transmission point devices, and the FAE is FAE between a serving transmission point device and any other transmission point device and/or FAE among antenna ports in a same transmission point device.

According to an embodiment of the present invention, the internal TAE is cell-specific, and the external TAE and FAE are UE-specific.

According to an embodiment of the present invention, the method further comprises determining, from the one or more UEs, a first set of UEs adapted to measure and feedback the internal TAE, and/or a second set of UEs adapted to measure and feedback the external TAE, and/or a third set of UEs adapted to measure and feedback the FAE.

According to an embodiment of the present invention, in the receiving step, the internal TAE, and/or external TAE, and/or FAE is received from the first, second, and third sets of UEs respectively.

According to an embodiment of the present invention, the method further comprises averaging a plurality of internal TAE measured by UEs among the first set of UEs associated with a same transmission point device, and/or averaging a plurality of FAE measured by UEs among the third set of UEs associated with a same pair of transmission point devices.

According to an embodiment of the present invention, in the compensating step, the internal TAE, and/or external TAE, and/or FAE for respective antenna ports is compensated on the basis of the averaged internal TAE, and/or the external TAE, and/or the averaged FAE.

According to an embodiment of the present invention, the step of determining the first set of UEs is performed according to channel condition thereof, the step of determining the second set of UEs is performed according to whether a UE is the UE being serviced by the CoMP transmission, and the step of determining the third set of UEs is performed according to channel condition thereof.

According to an embodiment of the present invention, the step of compensating the internal TAE is performed in time domain, and the steps of compensating the external TAE and the FAE are both performed in frequency domain.

According to an embodiment of the present invention, the step of compensating comprises compensating, on the basis of the received internal TAE, and/or external TAE, and/or FAE, phase differences for signals transmitted from the transmission point devices to respective antenna ports due to the internal TAE, and/or external TAE, and/or FAE.

According to a sixth aspect of the present invention, there is provided a computer program product. The computer program product comprises a computer readable medium, having stored thereon computer executable codes, when executed, causing a processor to perform the method according to the present invention.

According to a seventh aspect of the present invention, there is provided a computer readable medium, having stored thereon computer executable codes, when executed, causing a processor to perform the method according to the present invention.

The present invention provides a simple, direct and efficient approach for measuring and feeding back the cell-specific internal TAE and/or the UE-specific external TAE/FAE by UE and compensating the TAE and/or FAE by the transmission point device in the CoMP transmission, so that the CoMP transmission can properly operate.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. The elements of the drawings are not necessarily to scale relative to each other. Like reference numerals designate corresponding similar parts. It should be expressly understood that the drawings are included for illustrative purposes and do not in any manner limit the scope of the present invention.

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Figure 1:
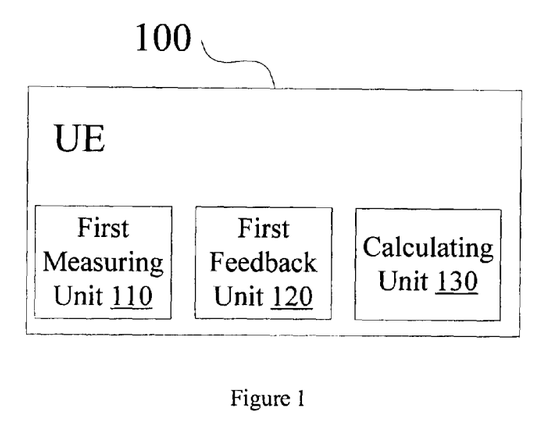
FIG. 1 is a block diagram illustrating a user equipment according to an embodiment of the present invention.
Figure 2:
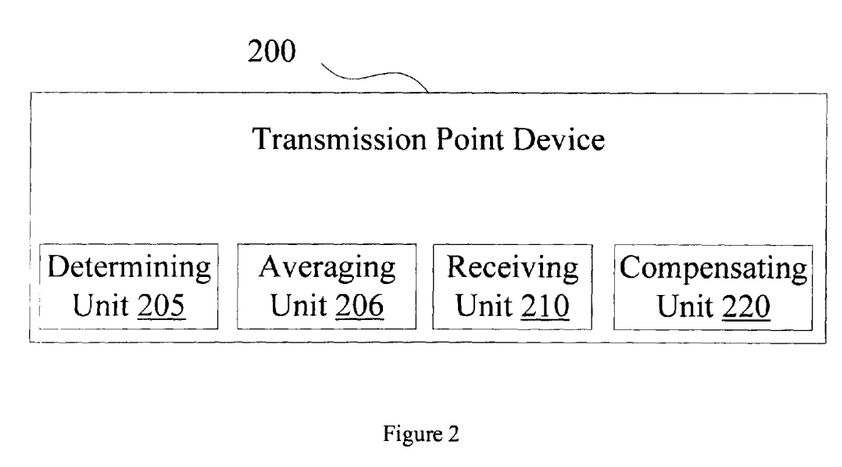
FIG. 2 is a block diagram illustrating a transmission point device according to an embodiment of the present invention.

FIG. 1 is a block diagram illustrating a user equipment (UE) 100 according to an embodiment of the present invention, and FIG. 2 is a block diagram illustrating a transmission point device 200 according to an embodiment of the present invention.

As shown in FIG. 1, the UE 100 may comprise a first measuring unit 110, a first feedback unit 120, and optionally a calculating unit 130. As shown in FIG. 2, the transmission point device 200 may comprise a receiving unit 210 and a compensating 220.

According to embodiments of the present invention, in order to improve the performance of the CoMP transmission, TAE and/or FAE is measured and fed back as channel state information (CSI) to the transmission point device. The first measuring unit 110 measures TAE and/or FAE for antenna ports belonging to transmission point devices in CoMP transmission. According to an embodiment of the present invention, the CoMP transmission may be the mode of joint transmission and/or the mode of coordinated scheduling/beamforming. The TAE includes internal TAE and/or external TAE.

Then, the first feedback unit 120 feeds back the measured internal TAE, and/or external TAE, and/or FAE to at least one of the transmission point devices.

Further and optionally, the calculating unit 130 calculates at least one of precoding matrix index (PMI), channel quality indicator (CQI), and rank indicator (RI) on the basis of channel compensated with the measured internal TAE, and/or external TAE, and/or FAE, and the first feedback unit 120 further feeds back a result of the calculation to the at least one of the transmission point devices.

Accordingly, in the transmission point device 200, the receiving unit 210 receives the internal TAE, and/or the external TAE, and/or the FAE from the UE 100, and the compensating unit 220 compensates the internal TAE, and/or external TAE, and/or FAE for respective antenna ports on the basis of the received internal TAE, and/or external TAE, and/or FAE.

Optionally, the compensating unit 220 may further compensate the internal TAE, and/or external TAE, and/or FAE for respective antenna ports on the basis of at least one of the calculated PMI, CQI and RI.

According to an embodiment of the present invention, the transmission point device may be one of a base station, Node B, or evolved Node B (eNB). Hereinafter, the present invention will be described with respect to an eNB for Long Term Evolution (LTE). However, such description is only exemplary, rather than restrictive, and the base station, Node B, or other entities with similar structures also apply to the present invention.

The internal TAE is the TAE among antenna ports of an eNB serving one cell, the external TAE is TAE among antenna ports of eNBs serving different cells, and the FAE is FAE between the eNB serving the UE, and any other eNBs and/or FAE among antenna ports in a same transmission point device. In CoMP transmission, one or more of the internal TAE, the external TAE, and the FAE may simultaneously exist. Accordingly, the compensation of any one, any two, or all of the internal TAE, the external TAE, and the FAE may be needed. Hereinafter, for the sake of conciseness, the expression of "TAE/FAE" might be used to represent the internal TAE, and/or the external TAE, and/or FAE, thus representing any one, any two, or all of them.

Figure 3:
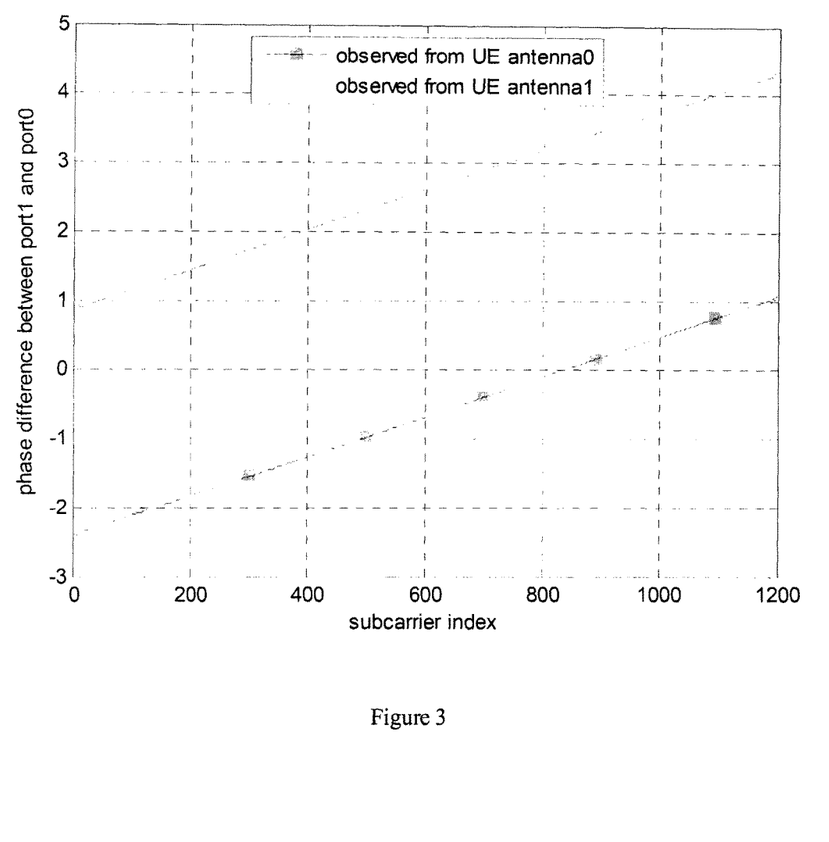
FIG. 3 is a graph illustrating phase difference between ports vs. subcarrier index from line of sight field measurement according to an embodiment of the present invention.

From equation (2), we can see that the TAE is the slope of phase over frequency. For a line of sight (LOS) channel, equation (2) is very close to the real measurement result in general, which is shown in FIG. 3, which illustrates phase difference between ports vs. subcarrier index (i.e., frequency) from LOS field measurement according to an embodiment of the present invention.

Therefore, the TAE between the $(k_1m_1)$th and $(k_2,m_2)$th ports can be given by:

$$TAE = \frac{\theta_{k_1,k_2,m_1,m_2}(f_1, t) - \theta_{k_1,k_2,m_1,m_2}(f_2, t)}{-j2\pi(f_1 - f_2)} \quad (4)$$

From equation (4), we can see that the TAE can be measured by the first measuring unit 110 based on the difference of the phases of different frequencies at a specified time. In order to improve the accuracy of the TAE, we can use more frequency samples to estimate the TAE based on the least square (LS) method.

Similarly, the FAE can be measured by:

$$FAE = \frac{\theta_{k_1,k_2,m_1,m_2}(f, t_1) - \theta_{k_1,k_2,m_1,m_2}(f, t_2)}{-j2\pi(t_1 - t_2)} \quad (5)$$

From equation (5), we can see that the FAE can be measured by the first measuring unit 110 based on the difference of the phases at different times at a specified frequency. In order to improve the accuracy of the FAE, more time samples can be utilized based on some traditional optimized techniques known in the art.

The above mentioned approach for measuring TAE and FAE is only exemplary, rather than restrictive, and other approaches may also be adopted.

According to an embodiment of the present invention, one UE is used to measure and feedback TAE/FAE to the eNB. Alternatively, a plurality of UEs may be used. Optionally, there three sets of UEs are used: a first set of UEs each comprising a second measuring unit adapted to measure the internal TAE and a second feedback unit adapted to feedback the internal TAE to at least one of the eNBs, a second set of UEs each comprising a third measuring unit adapted to measure the external TAE and a third feedback unit adapted to feedback the external TAE to the at least one of the eNBs, and a third set of UEs each comprising a fourth measuring unit adapted to measure the FAE and a fourth feedback unit adapted to feedback the FAE to the at least one of the eNBs. The above three sets may be completely different sets, or may be partially overlapped, or may be completely overlapped. Further, based on whether any one, any two, or all of the internal TAE, external TAE, and FAE exist, any one, any two, or all of the three sets of UEs are needed.

Figure 4:
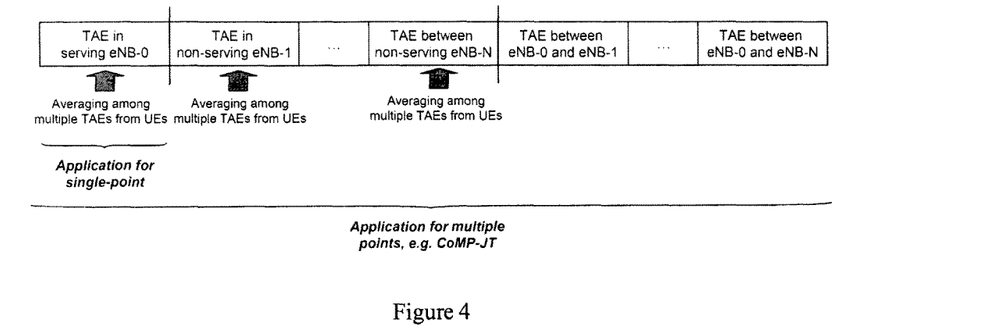
FIG. 4 is a diagram illustrating a process of simultaneous multiple TAE feedback according to an embodiment of the present invention.

For the internal TAE, different UEs will see same internal TAE. Hence, the internal TAE is cell-specific. For the external TAE, each UE can measure and feedback the external TAE of neighboring cooperating eNBs with respect to its own serving eNB. These TAEs are different for different UEs, since the delay in the air varies from different UEs. As a result, the external TAE is UE-specific. Thus, the external TAE cannot be averaged over different UEs. A possible simultaneous multiple TAE feedback is shown in the FIG. 4. As shown in FIG. 4, the internal TAE can be obtained by averaging among TAE from UEs in a same cell, and/or the external TAE may be TAE between UE's own serving eNB and a non-serving eNB.

Figure 5:
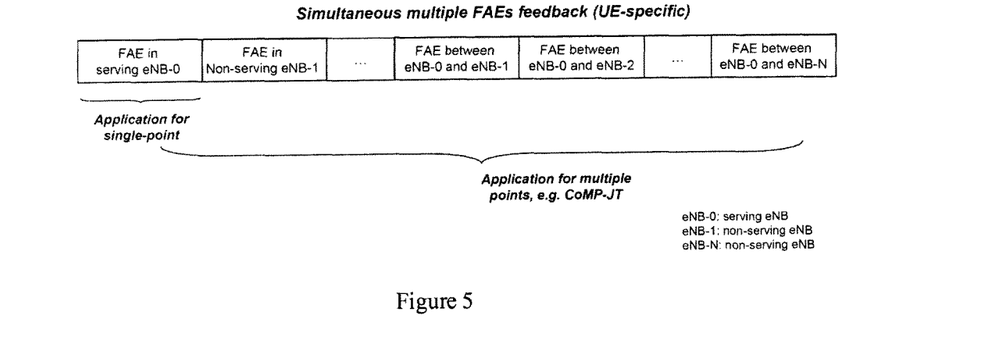
FIG. 5 is diagram illustrating a process of simultaneous multiple FAE feedback according to an embodiment of the present invention.

Further, the FAE is also UE-specific. A simultaneous multiple FAE feedback could include FAE measurement between a serving eNB and any other cooperating eNB and/or FAE measurement among antenna ports in a same eNB. FIG. 5 shows a possible simultaneous multiple FAE feedback, wherein FAE between a serving eNB and any other cooperating non-serving eNB and/or FAE among antenna ports in a same eNB is measured and fed back.

According to an embodiment of the present invention, the transmission point device 200 may further comprise a determining unit 205, which can determine, from a plurality of UEs, the first, and/or second, and/or third sets of UEs.

In particular, the determining unit 205 in a serving eNB can dynamically determine the three sets of UEs. Optionally, the determining unit 205 determines UEs that experience good channel conditions as the first set of UEs, e.g., UEs with LOS, high Signal-to-Interference-plus-Noise Ratio (SINR), or flat channel. Under such conditions, a UE is expected to measure the TAE with good accuracy. These UEs can be single-cell UEs and can also be CoMP UEs.

Further, the determining unit 205 determines UEs which are being serviced by the CoMP transmission as the second set of UEs, because only the CoMP UEs need eNB to compensate the external TAE.

Furthermore, the determining unit 205 determines UEs with good channel conditions as the third set of UEs, e.g., UEs with low speed and high SINR. A UE in e.g., CoMP-JT mode can be determined as one of the third set, and other UEs in non-CoMP-JT mode can also be included. Both of these UEs can measure FAE between their serving eNB and neighboring eNBs and/or FAE among antenna ports in their serving eNB. The above described determination could be based on uplink channel estimation and other quality estimation.

Accordingly, the receiving unit 210 receives the internal TAE, and/or external TAE, and/or FAE from the first, second, and third sets of UEs respectively.

According to an embodiment of the present invention, the transmission point device 200 may further comprise an averaging unit 206. The averaging unit 206 can average a plurality of internal TAE measured by UEs among the first set of UEs associated with a same transmission point device received by the receiving unit 210, and/or average a plurality of FAE measured by UEs among the third set of UEs associated with a same pair of transmission point devices received by the receiving unit 210, so that the accuracy of the measurement for TAE/FAE can be enhanced.

Then, on the basis of the averaged internal TAE, and/or the external TAE, and/or the averaged FAE, the compensating unit 220 can compensate the internal TAE, and/or external TAE, and/or FAE for respective antenna ports.

According to an embodiment of the present invention, the composited compensation signal in the $k^{th}$ port of the $m^{th}$ transmission point device can be given by:

$$S_{k,m}(t) = \sum_{i=0}^{N} \exp(-j2\pi * FAE_{k,m}(i) * t) S_i(t - (TAE_{k,m}(i))) \quad (6)$$

wherein $s_i(t)$ is a original signal transmitted to the $i^{th}$ UE, $FAE_{k,m}(i)$ and $TAE_{k,m}(i)$ are the $i^{th}$ UE's FAE and TAE at the (k,m)th antenna port, and N is the number of the UEs. $TAE_{k,m}(i)$ includes the internal TAE and the external TAE.

According to an embodiment of the present invention, the compensating unit 220 compensates the internal TAE in time domain, and compensates the external TAE and the FAE both in frequency domain. Further, according to an embodiment of the present invention, the compensating unit 220 may compensate, on the basis of the received internal TAE, and/or external TAE, and/or FAE, phase differences for signals transmitted from the transmission point devices to respective antenna ports due to the internal TAE, and/or external TAE, and/or FAE. However, this is only exemplary, and other compensation approaches can also be adopted.

In principle, the internal TAE and FAE compensation can be used by single-cell UEs as well as CoMP UEs, and the external TAE compensation are only valid for CoMP UEs.

Optionally, the internal TAE is firstly compensated, and then the external TAE and the FAE are compensated. However, such order for compensation is only exemplary, and other orders can also be adopted according to actual demands.

Embodiments of the present invention also provide a system for compensating TAE and/or FAE for antenna ports belonging to transmission point devices in CoMP transmission, and the system comprises one or more UEs and the transmission point device according to the above-described embodiments of the present invention.

Figure 6:
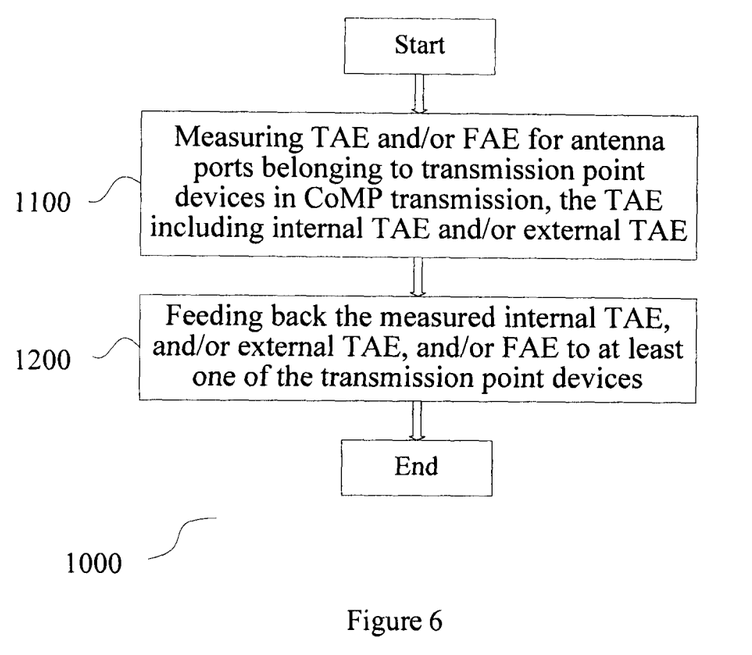
FIG. 6 is a flow chart illustrating a method for use in a user equipment according to an embodiment of the present invention.
Figure 7:
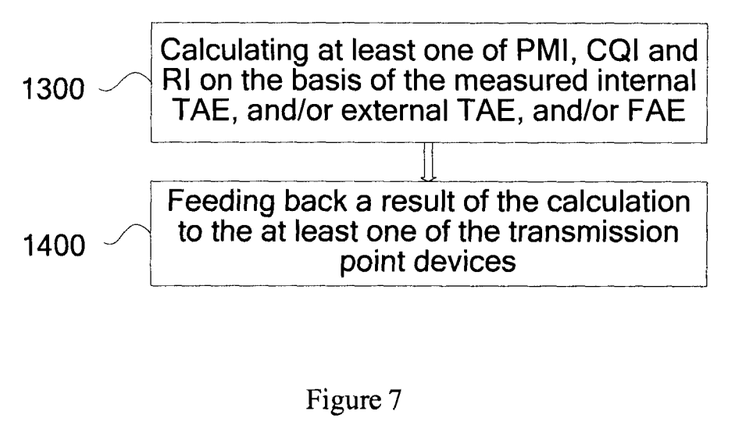
FIG. 7 is a flow chart illustrating optional steps in the method for use in a user equipment according to an embodiment of the present invention.
Figure 8:
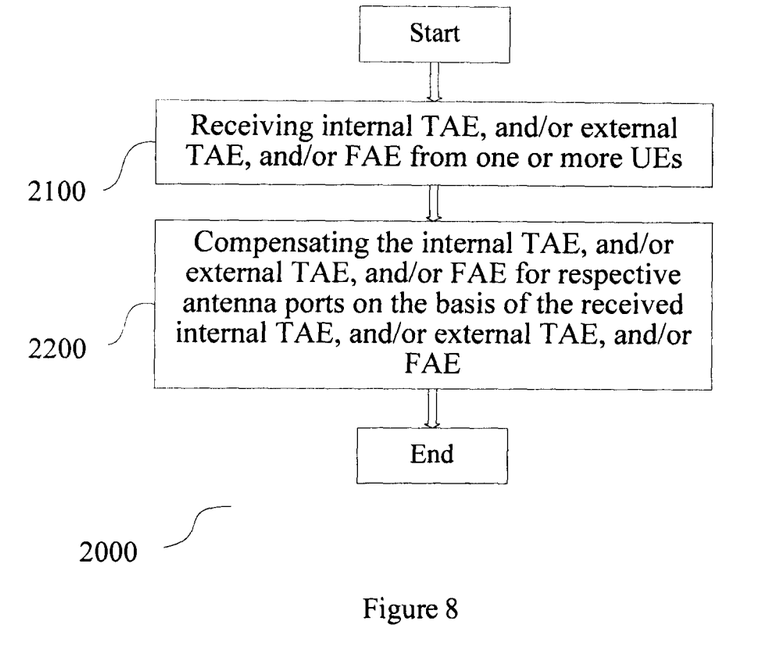
FIG. 8 is a flow chart illustrating a method for compensating time alignment error and/or frequency alignment error for antenna ports belonging to transmission point devices in Coordinated Multipoint Transmission by a transmission point device according to an embodiment of the present invention.

FIG. 6 is a flow chart illustrating a method 1000 for use in a user equipment according to an embodiment of the present invention, FIG. 7 is a flow chart illustrating optional steps in the method for use in a user equipment according to an embodiment of the present invention, and FIG. 8 is a flow chart illustrating a method 2000 for compensating TAE and/or FAE for antenna ports belonging to transmission point devices in CoMP by a transmission point device according to an embodiment of the present invention. According to an embodiment of the present invention, the CoMP transmission may be the mode of joint transmission and/or the mode of coordinated scheduling/beamforming. The TAE includes internal TAE and/or external TAE.

Optionally, the method 1000 can be performed by the above-described UE 100 according to the present invention, and the method 2000 can be performed by the above-described transmission point device 200 according to the present invention.

As shown in FIG. 6, the method 1000 begins with a step 1100 of measuring TAE and/or FAE for antenna ports belonging to transmission point devices in CoMP transmission. Optionally, the step 1100 can be performed by the above-described first measuring unit 110 of the UE 100 according to the present invention. The TAE includes internal TAE and/or external TAE.

Then, at the step 1200, the measured internal TAE, and/or external TAE, and/or FAE is fed back to at least one of the transmission point devices. Optionally, the step 1200 can be performed by the above-described first feedback unit 120 of the UE 100 according to the present invention.

According to an embodiment of the present invention, as shown in FIG. 7, the method 100 may further comprise a step 1300 of calculating at least one of precoding matrix index (PMI), channel quality indicator (CQI), and rank indicator (RI) on the basis of channel compensated with the measured internal TAE, and/or external TAE, and/or FAE, and a step 1400 of feeding back a result of the calculation to the at least one of the transmission point devices. Optionally, the steps 1300 and 1400 can be respectively performed by the above-described calculating unit 130 and the first feedback unit 120 of the UE 100 according to the present invention.

Accordingly and as shown in FIG. 8, the method 2000 begins with a step 2100 of receiving internal TAE, and/or external TAE, and/or FAE from one or more UEs. Optionally, the step 2100 can be performed by the above-described receiving unit 210 of the transmission point device 200 according to the present invention.

Then, at the step 2200, the internal TAE, and/or external TAE, and/or FAE for respective antenna ports are compensated on the basis of the received internal TAE, and/or external TAE, and/or FAE. Optionally, the step 2200 can be performed by the above-described compensating unit 220 of the transmission point device 200 according to the present invention.

Optionally, the internal TAE, and/or external TAE, and/or FAE for respective antenna ports may further be compensated on the basis of at least one of the calculated PMI, CQI and RI.

According to an embodiment of the present invention, the transmission point device may be one of base station, Node B, or evolved Node B (eNB). As mentioned above and exemplarily, the present invention will be described with respect to eNB for Long Term Evolution (LTE) hereinafter.

As mentioned above, the internal TAE is TAE among antenna ports of an eNB in a same cell, the external TAE is TAE among antenna ports of eNBs in different cells, and the FAE is FAE between a serving eNB and any other eNBs and/or FAE among antenna ports in a same eNB. The internal TAE is cell-specific, and the external TAE and the FAE are UE-specific. In CoMP transmission, the internal TAE, the external TAE, and the FAE may coexist or separately exist. Accordingly, the compensation of any one, any two, or all of the internal TAE, the external TAE, and the FAE may be needed. Hereinafter, for the sake of conciseness, the expression of "TAE/FAE" might be used to represent the internal TAE, and/or the external TAE, and/or FAE, thus representing any one, any two, or all of them.

The above description of the example of measuring the TAE and the FAE by the first measuring unit 110 made with reference to FIG. 3 and equations (4) and (5) also applies to the measuring step 1100, and is thus not iterated for the sake of conciseness. Accordingly, the step of measuring the TAE can be performed on the basis of phase difference between ports of different frequencies at a specific time, and the step of measuring the FAE can be performed on the basis of phase difference between ports at different times of a specific frequency.

Again, according to an embodiment of the present invention, only one UE is used to measure and feedback TAE/FAE to the eNB. Alternatively, a plurality of UEs may be adopted. Optionally, there may be three sets of UEs: a first set of UEs each measuring the internal TAE and feeding back the internal TAE to at least one of the eNBs, a second set of UEs each measuring the external TAE and feeding back the external TAE to the at least one of the eNBs, and a third set of UEs each measuring the FAE and feeding back the FAE to the at least one of the eNBs. The above three sets may be completely different sets, or may be partially overlapped, or may be completely overlapped. Further, based on whether any one, any two, or all of the internal TAE, external TAE, and FAE exist, any one, any two, or all of the three sets of UEs are needed.

The above description of the example of simultaneous multiple TAE and FAE feedback made with reference to FIG. 4 and FIG. 5 also applies to the method 1000, and is thus not iterated for the sake of conciseness.

According to an embodiment of the present invention, the method 2000 may further comprise a step of determining, from the one or more UEs, the first, and/or second, and/or third sets of UEs (2050). Optionally, the step 2050 can be performed by the above-described determining unit 205 of the transmission point device 200 according to the present invention, and the detailed operations of the determining unit 205 also apply to the step 2050, and is thus not iterated for the sake of conciseness. In particular, the step of determining the first set of UEs is performed according to channel condition thereof, the step of determining the second set of UEs is performed according to whether a UE is the UE being serviced by the CoMP transmission, and the step of determining the third set of UEs is performed according to channel condition thereof.

Accordingly, the internal TAE, and/or external TAE, and/or FAE is received from the first, second, and third sets of UEs respectively in the step 2100.

According to an embodiment of the present invention, the method 2000 may further comprising averaging a plurality of internal TAE measured by UEs among the first set of UEs associated with a same transmission point device, and/or averaging a plurality of FAE measured by UEs among the third set of UEs associated with a same pair of transmission point devices. Thus, the accuracy of the measurement for TAE/FAE can be enhanced. This averaging step can be optionally performed by the above-described averaging unit 206 of the transmission point device 200 according to the present invention.

Then, at the step 2200, on the basis of the averaged internal TAE, and/or external TAE, and/or the averaged FAE, the internal TAE, and/or external TAE, and/or FAE for respective antenna ports can be compensated.

Again, according to an embodiment of the present invention, the composited compensation signal in the $k^{th}$ port of the $m^{th}$ transmission point device can be given by the equation (6) described above.

According to an embodiment of the present invention, the internal TAE can be compensated in time domain, and the external TAE and the FAE can both be compensated in frequency domain. Further, according to an embodiment of the present invention, the step 2200 may comprise compensating, on the basis of the received internal TAE, and/or external TAE, and/or FAE, phase differences for signals transmitted from the transmission point devices to respective antenna ports due to the internal TAE, and/or external TAE, and/or FAE. However, this is only exemplary, and other compensation approaches can also be adopted.

Also, as for the order for compensation, the internal TAE can be firstly compensated, and then the external TAE and the FAE can be compensated. However, such order for compensation is only exemplary, and other orders can also be adopted according to actual demands.

Furthermore, embodiments of the present invention may mutatis mutandis apply to the application scenario of single-point transmission, wherein TAE is TAE among antenna ports in a same transmission point device, and FAE is FAE among antenna ports in the same transmission point device. For instance, at the UE side, firstly, TAE and/or FAE for antenna ports belonging to a transmission point device can be measured. The TAE and FAE may both be cell-specific. Optionally, measuring the TAE may be performed on the basis of phase difference between antenna ports of different frequencies at a specific time, and measuring the FAE may be performed on the basis of phase difference between antenna ports at different times of a specific frequency. Secondly, the measured TAE and/or FAE may be fed back to the transmission point device. Further and optionally, at least one of precoding matrix index (PMI), channel quality indicator (CQI), and rank indicator (RI) can be calculated on the basis of channel compensated with the measured TAE and/or FAE, and a result of the calculation can be fed back to the transmission point device.

Further, at the side of the transmission point device in the single-point transmission, for instance, firstly, the TAE and/or FAE can be received from one or more UEs; secondly, the TAE and/or FAE for respective antenna ports can be compensated on the basis of the received TAE and/or FAE. Optionally, compensating the TAE can be performed in time domain, and compensating the FAE can be performed in frequency domain; further, such compensation may comprise compensating, on the basis of the received TAE and/or FAE, phase differences for signals transmitted from the transmission point device to respective antenna ports due to the TAE and/or FAE. Further and optionally, a plurality of TAE and/or FAE measured by UEs associated with a same transmission point device can be averaged, and thus the TAE and/or FAE for respective antenna ports can be compensated on the basis of the averaged TAE and/or averaged FAE.

Figure 9:
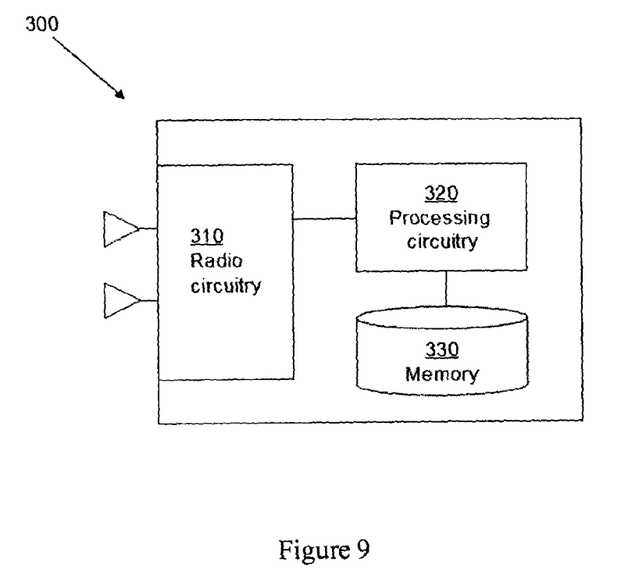
FIG. 9 is a schematic diagram illustrating an example UE 300.

Although the illustrated user equipment (UE) may represent a communication device that includes any suitable combination of hardware and/or software, the UE may, in particular embodiments, represent a device such as the example UE 300 illustrated in greater detail by FIG. 9. Similarly, although the illustrated transmission point device may represent transmission point device that includes any suitable combination of hardware and/or software, these transmission point devices may, in particular embodiments, represent devices such as the example transmission point device 400 illustrated in greater detail by FIG. 10.

As shown in FIG. 9, the example UE 300 includes processing circuitry 320, a memory 330, radio circuitry 310, and at least one antenna. The radio circuitry 310 may comprise RF circuitry and baseband processing circuitry (not shown). In particular embodiments, some or all of the functionality described above as being provided by the first measuring unit 110 and the first feedback unit 120 may be provided by the processing circuitry 320 executing instructions stored on a computer-readable medium, such as the memory 330 shown in FIG. 9. Alternative embodiments of the UE 300 may include additional components beyond those shown in FIG. 9 that may be responsible for providing certain aspects of the UE's functionality, including any of the functionality described above and/or any functionality necessary to support the solution described above.

Figure 10:
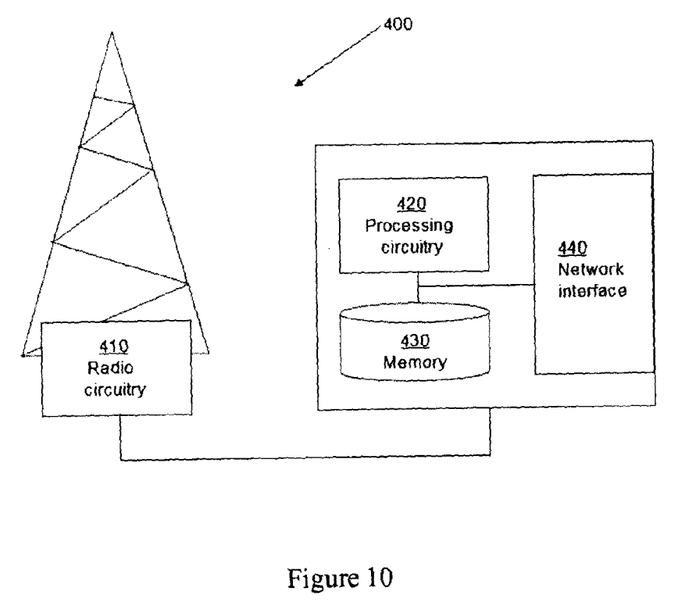
FIG. 10 is a schematic diagram illustrating an example transmission point device 400.

As shown in FIG. 10, the example transmission point device 400 includes processing circuitry 420, a memory 430, radio circuitry 410, network interface 440, and at least one antenna. The processing circuitry 420 may comprise RF circuitry and baseband processing circuitry (not shown). In particular embodiments, some or all of the functionality described above as being provided by the receiving unit 210 and the compensating unit 220 may be provided by the processing circuitry 420 executing instructions stored on a computer-readable medium, such as the memory 430 shown in FIG. 10. Alternative embodiments of the network node 400 may include additional components responsible for providing additional functionality, including any of the functionality identified above and/or any functionality necessary to support the solution described above.

Embodiments of the present invention may also be embodied as one or more device or apparatus programs (e.g. computer programs and computer program products) for carrying out part(s) or all of the steps of the methods described above. Such programs embodying the present invention may be stored on computer readable medium, or could, for example, be in the form of one or more signals. Such signals may be data signals downloadable from an Internet website, or provided on a carrier signal, or in any other forms.

Thus, the present invention provides a simple, direct and efficient approach for measuring and feeding back the cell-specific internal TAE and/or the UE-specific external TAE/FAE by UE and compensating the TAE/FAE by the transmission point device in the CoMP transmission, so that the CoMP transmission can properly operate. As compared with UE's sub-band PMI feedback, the present invention provides a faster way to measure TAE and has lower overhead for TAE feedback. Further, according to some embodiments, the UE sets for measuring and feeding back TAE/FAE can be dynamically determined by the transmission point device using high layer signaling; a serving transmission point device shares received TAE/FAE over 3GPP X2 protocol with non-serving transmission point devices; and simultaneous multiple TAE/FAE feedback by UE is supported. Embodiments of the present invention are applicable to many application scenarios, e.g., single-point transmission, multiple-point transmission, distributed antenna systems, or MIMO systems with multiple radio remote units (RRUs), etc.

It should be noted that the aforesaid embodiments are exemplary rather than limiting the present invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as symbols.

The invention claimed is:

1. A user equipment (UE), comprising:
a first measuring unit configured to measure time alignment error (TAE) and frequency alignment error (FAE), for antenna ports belonging to transmission point devices in Coordinated Multipoint (CoMP) Transmission, the TAE including internal TAE and external TAE, wherein the TAE is measured based on a first phase difference between the antenna ports of different frequencies at a specific time and the FAE is measured based on a second phase difference between the antenna ports of a specific frequency at different times, and wherein the internal TAE is the TAE among antenna ports in a same transmission point device, the external TAE is the TAE among antenna ports in different transmission point devices, and the FAE is at least one of FAE between a serving transmission point device and any other transmission point device, and FAE among the antenna ports in the same transmission point device;
a first feedback unit configured to feed back the measured internal TAE, the measured external TAE, and the measured FAE, to at least one of the transmission point devices; and
a calculating unit configured to calculate a precoding matrix index (PMI), a channel quality indicator (CQI), and a rank indicator (RI) on the basis of a channel compensated with the measured internal TAE, the measured external TAE, and the measured FAE.

2. The UE according to claim 1, wherein the first feedback unit is further configured to feed back a result of the calculation to the at least one of the transmission point devices.

3. A transmission point device for compensating at least one of time alignment error (TAE) and frequency alignment error (FAE), for antenna ports belonging to transmission point devices in Coordinated Multipoint (CoMP) Transmission, the TAE including at least one of an internal TAE and an external TAE, and wherein the transmission point device comprises:
a determining unit configured to determine, from a plurality of UEs, a first set of UEs configured to measure the internal TAE and feed back the internal TAE measurements, a second set of UEs configured to measure the external TAE and feed back the external TAE measurements, and a third set of UEs configured to measure the FAE and feed back the FAE measurements, wherein the determining the first set of UEs is performed according to channel conditions thereof, wherein the determining the second set of UEs is performed according to whether a UE of plurality of UEs is the UE being serviced by the CoMP transmission, and wherein the determining the third set of UEs is performed according to the channel conditions thereof;

a receiving unit configured to receive the internal TAE measurements from the first set of UEs, the external TAE measurements from the second set of UEs, and the FAE measurements from the third set of UEs, wherein the TAE is measured based on a first phase difference between the antenna ports of different frequencies at a specific time and the FAE is measured based on a second phase difference between the antenna ports of a specific frequency at different times; and a compensating unit configured to compensate for at least one of the internal TAE, the external TAE, and the FAE, for respective antenna ports, on the basis of any one or more of the received internal TAE measurements, the received external TAE measurements, and the received FAE measurements.

4. The transmission point device according to claim 3, further comprising an averaging unit configured to perform at least one of:

average a plurality of the internal TAE measurements received from UEs that are among the first set of UEs and associated with a same transmission point device; and average a plurality of the FAE measurements received from UEs that are among the third set of UEs and associated with a same pair of the transmission point devices.

5. The transmission point device according to claim 3, wherein the compensation for a given antenna port of the transmission point device is based on a composited compensation signal in the given antenna port.

6. The transmission point device according to claim 5, wherein the composited compensation signal in the given antenna port is determined based on the internal and/or external TAE measurements received for the given antenna port, the FAE measurements received for the given antenna port, and an original signal transmitted to the plurality of UEs.

7. A method for use in a user equipment (UE), comprising:
measuring time alignment error (TAE) and frequency alignment error (FAE), for antenna ports belonging to transmission point devices in Coordinated Multipoint (CoMP) Transmission, the TAE including internal TAE and external TAE, wherein the TAE is measured based on a first phase difference between the antenna ports of different frequencies at a specific time and the FAE is measured based on a second phase difference between the antenna ports of a specific frequency at different times, and wherein the internal TAE is the TAE among antenna ports in a same transmission point device, the external TAE is the TAE among antenna ports in different transmission point devices, and the FAE is at least one of FAE between a serving transmission point device and any other transmission point device, and FAE among antenna ports in the same transmission point device;

feeding back the measured internal TAE, the measured external TAE, and the measured FAE, to at least one of the transmission point devices; and calculating a precoding matrix index (PMI), a channel quality indicator (CQI), and a rank indicator (RI) on the basis of a channel compensated with the measured internal TAE, the measured external TAE, and the measured FAE.

8. The method according to claim 7, wherein the internal TAE is cell-specific, and the external TAE and the FAE are UE-specific.

9. The method according to claim 7, further comprising:
feeding back a result of the calculation to the at least one of the transmission point devices.

10. The method according to claim 7, wherein the UE belongs to at least respective one of a first set of UEs, a second set of UEs, and a third set of UEs, and wherein:

the first set of UEs each measuring the internal TAE and feeding back internal TAE measurements to the at least one of the transmission point devices;

the second set of UEs each measuring the external TAE and feeding back external TAE measurements to the at least one of the transmission point devices; and the third set of UEs each measuring the FAE and feeding back FAE measurements to the at least one of the transmission point devices.

11. A method for compensating for at least one of time alignment error (TAE) and frequency alignment error (FAE), for antenna ports belonging to transmission point devices in Coordinated Multipoint (CoMP) Transmission, the TAE including at least one of internal TAE and external TAE, and the method performed by a transmission point device and comprising:

determining, from a plurality of UEs, a first set of UEs configured to measure the internal TAE and feed back the internal TAE measurements, a second set of UEs configured to measure the external TAE and feed back the external TAE measurements, and a third set of UEs configured to measure the FAE and feed back the FAE measurements, wherein the determining the first set of UEs is performed according to channel conditions thereof, wherein the determining the second set of UEs is performed according to whether a UE is the UE being serviced by the CoMP transmission, and wherein the determining the third set of UEs is performed according to the channel conditions thereof;

receiving one or more of the internal TAE measurements from the first set of UEs, the external TAE measurements from the second set of UEs, and the FAE measurements from the third set of UEs, wherein the TAE is measured based on a first phase difference between the antenna ports of different frequencies at a specific time and the FAE is measured based on a second phase difference between the antenna ports of a specific frequency at different times; and compensating at least one of the internal TAE, the external TAE, and the FAE for respective antenna ports, on the basis of any one or more of the received internal TAE measurements, the received external TAE measurements, and the received FAE measurements.

12. The method according to claim 11, wherein the internal TAE is TAE among antenna ports in a same transmission point device, the external TAE is TAE among antenna ports in different transmission point devices, and the FAE is at least one of FAE between a serving transmission point device and any other transmission point device, and FAE among antenna ports in a same transmission point device.

13. The method according to claim 11, wherein the internal TAE is cell-specific, and the external TAE and the FAE are UE-specific.

14. The method according to claim 11, wherein the receiving step includes at least one of: receiving the internal TAE measurements from a first group of UEs, receiving the external TAE measurements from a second group of UEs, and receiving the FAE measurements from a third group of UEs.

15. The method according to claim 11, further comprising at least one of:

averaging a plurality of the internal TAE measurements received from UEs that are among the first set of UEs and associated with a same transmission point device; and averaging a plurality of the FAE measurements received from UEs that are among the third set of UEs and associated with a same pair of the transmission point devices.

16. The method according to claim 15, wherein the compensating step includes compensating any one or more of the internal TAE, the external TAE, and the FAE for respective antenna ports, on the basis of any one or more of the averaged internal TAE measurements, the external TAE measurements, and the averaged FAE measurements.

17. The method according to claim 11, wherein the step of compensating comprises compensating phase differences for signals transmitted from the transmission point devices to respective antenna ports that are due to any one or more of the internal TAE, the external TAE, and the FAE, on the basis of any one or more of the internal TAE measurements, the external TAE measurements, and the FAE measurements.

* * * * *

UNITED STATES PATENT AND TRADEMARK OFFICE
CERTIFICATE OF CORRECTION

PATENT NO. : 10,110,407 B2  
APPLICATION NO. : 14/238344  
DATED : October 23, 2018  
INVENTOR(S) : Wang et al.

Page 1 of 1

It is certified that error appears in the above-identified patent and that said Letters Patent is hereby corrected as shown below:

In the Specification

In Column 2, Line 12, delete "2.6π." and insert -- 2.6 π. --, therefor.

In Column 6, Line 42, delete "300;" and insert -- 300; and --, therefor.

In Column 7, Line 3, delete "compensating 220." and insert -- compensating unit 220. --, therefor.

In Column 7, Line 62, delete "$(k_1m_1)$th" and insert -- $(k_1,m_1)$th --, therefor.

In Column 10, Line 44, delete "method 100" and insert -- method 1000 --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*